CONTROL MECHANISM FOR BOWLING PIN SPOTTING MACHINE

Original Filed March 7, 1958 3 Sheets-Sheet 1

CONTROL MECHANISM FOR BOWLING PIN SPOTTING MACHINE

Original Filed March 7, 1958 3 Sheets-Sheet 2

CONTROL MECHANISM FOR BOWLING PIN SPOTTING MACHINE
Original Filed March 7, 1958 3 Sheets-Sheet 3
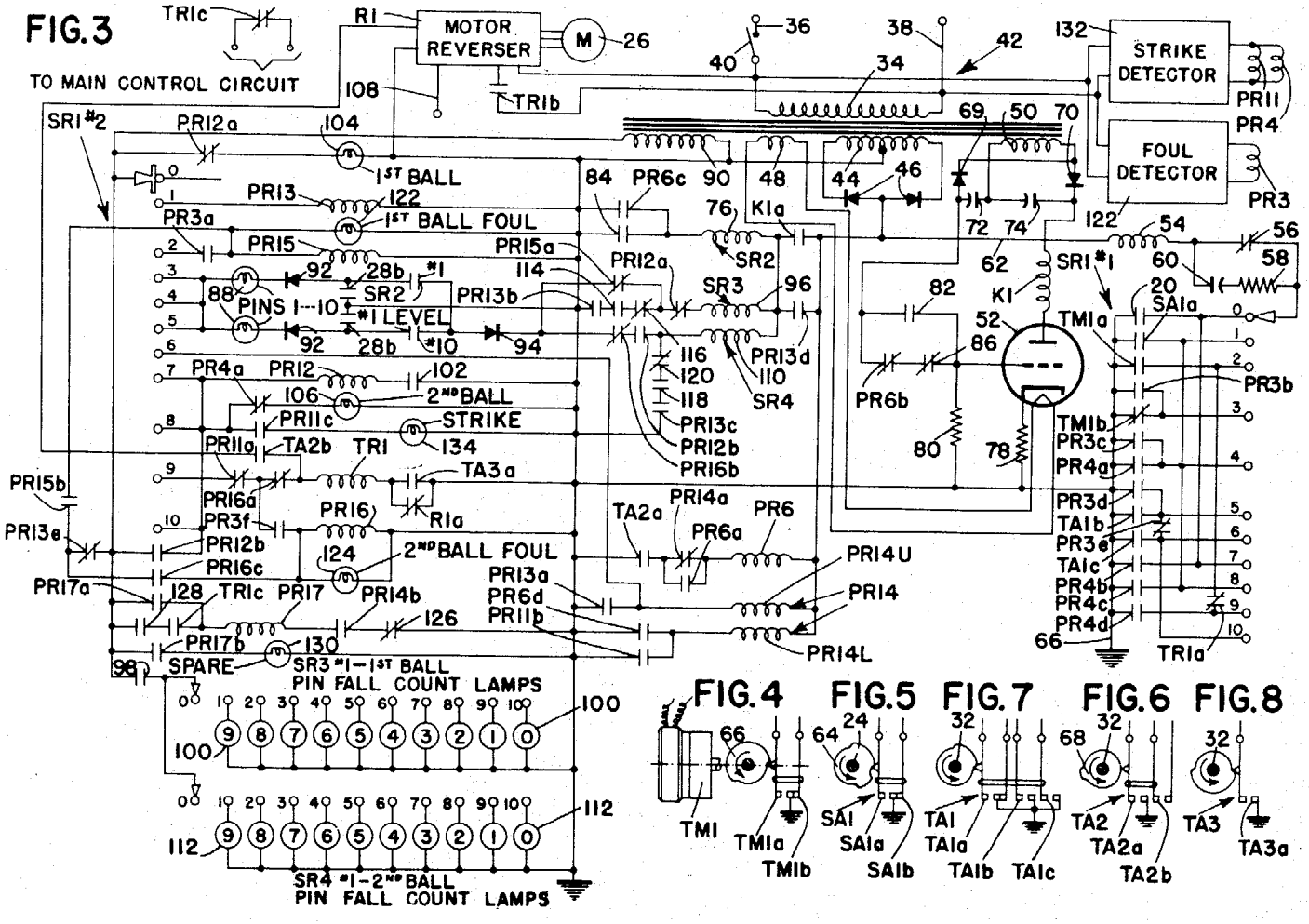

United States Patent Office

Re. 27,416
Reissued July 4, 1972

27,416

CONTROL MECHANISM FOR BOWLING PIN SPOTTING MACHINE

Richard D. Walsh, Shelby, Ohio, assignor to American Machine & Foundry Company

Original No. 2,974,955, dated Mar. 14, 1961, Ser. No. 719,823, Mar. 7, 1958. Application for reissue Mar. 12, 1963, Ser. No. 266,135

Int. Cl. A63d *5/04*

U.S. Cl. 273—43 A 11 Claims

Figure 1:
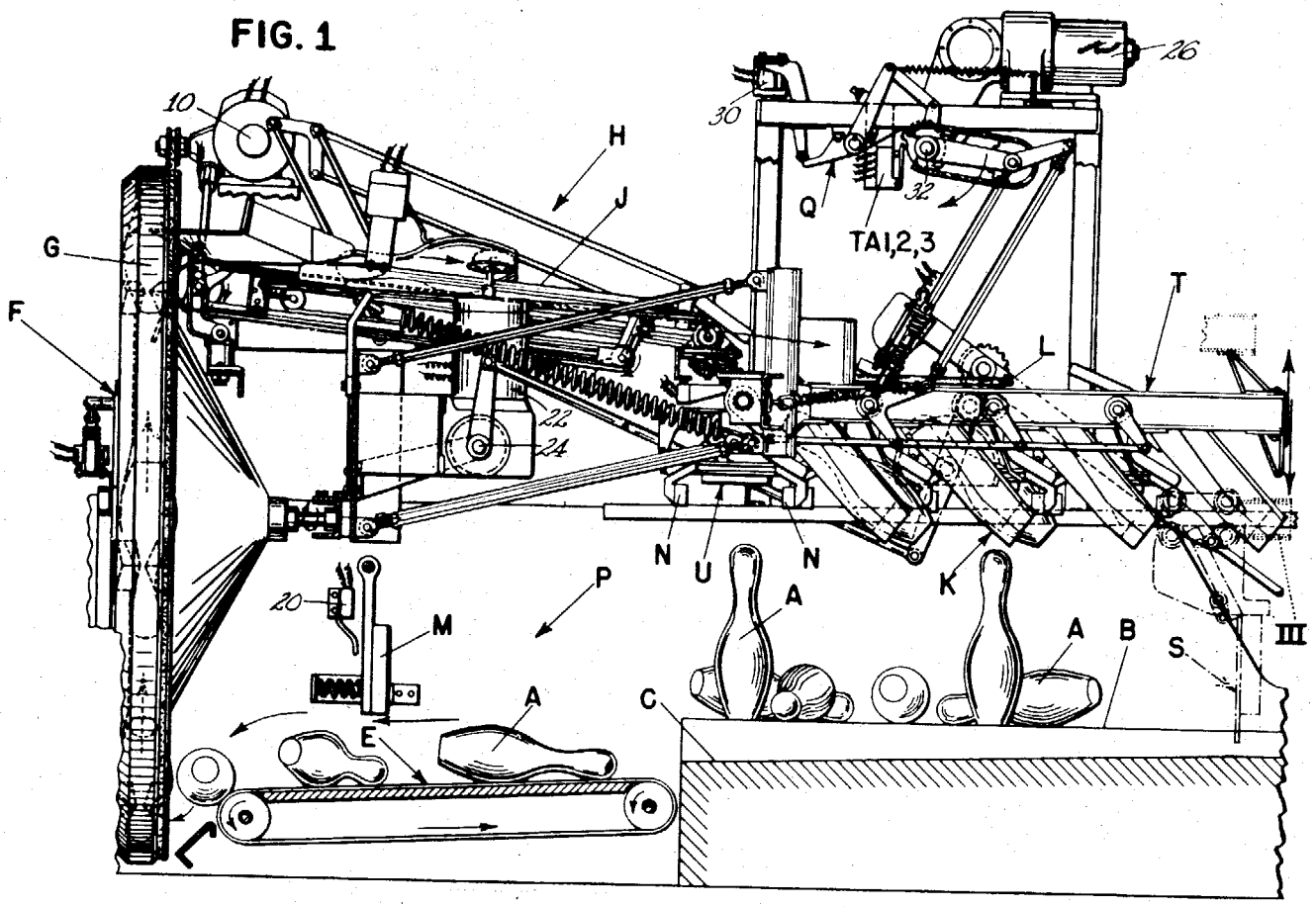

Matter enclosed in heavy brackets [ ] appears in the original patent but forms no part of this reissue specification; matter printed in italics indicates the additions made by reissue.

This invention relates to automatic bowling pin setting machines and more particularly to mechanism for totalizing and indicating to the player, the number of pins knocked down each time a ball is rolled during a frame of a bowling game.

During the playing of a bowling game it is customary for the players to use scoring charts on which the pinfall is recorded each time a ball is rolled, as part of the cumulative, frame-by-frame score. It is therefore desirable that the total number of pins knocked down be automatically and visually indicated to the played immediately after each ball has been rolled. Heretofore, apparatus has been provided for identifying and indicating the pins left standing after the rolling of each ball but the player himself had to calculate the total number of fallen pins in order to enter the correct score. On pin setting machines not equipped with such devices for identifying the standing pins, the totalizing is somewhat difficult due to the sole reliance on the player's vision to accurately count the pins still standing and obtain therefrom the total number of fallen pins for entry on the scoring sheet.

Furthermore, in tournament playing the rules of the American Bowling Congress require that an official scoring observer be located near the rear of the alley bed to observe the events occurring on the pin deck in order that official scoring may be made accurately. Due to the relatively large size and structural complexity of automatic pin setting machines, the pin deck is often obscured during certain cycles of operation of the machine, thereby making accurate observation of the number of fallen pins at those times a difficult task.

It is therefore an object of the invention to provide mechanism for totalizing the number of pins knocked down after each ball is rolled and remotely indicating such totals to the player.

It is another object of the invention to provide mechanism for automatically informing the player of the total number of pins knocked down or remaining standing after each ball is rolled, and whether a strike has occurred after the rolling of a first ball, or a spare has occurred after the rolling of a second ball.

It is a further object of the invention to provide mechanism for selectively operating an indicating and totalizing device which indicates visibly the effect of each ball rolled, differentiates automatically between strikes and spares and less than ten pins knocked down for each ball rolled, fouls, and totalizes the number of pins knocked down only when such pins are scorable according to the playing rules of a bowling game.

It is still another object of the invention to provide mechanism for totalizing the number of pins knocked down after each ball is rolled and indicating such totals to the scorer who is located in a position where he is unable to view the alley bed.

It is yet another object of the invention to provide sensing means for indicating the presence of standing pins disposed about the pin spotting and respotting table in a manner such that the means are operative each time a ball is rolled. The invention further provides means for interrogating said sensing means after they have had an opportunity to test for standing pins, said interrogating means having means for actuating registering means for totalizing the results of the interrogation. The invention further includes the provision of indicating devices for indicating to the player such totals as soon as they are received.

Figure 2:
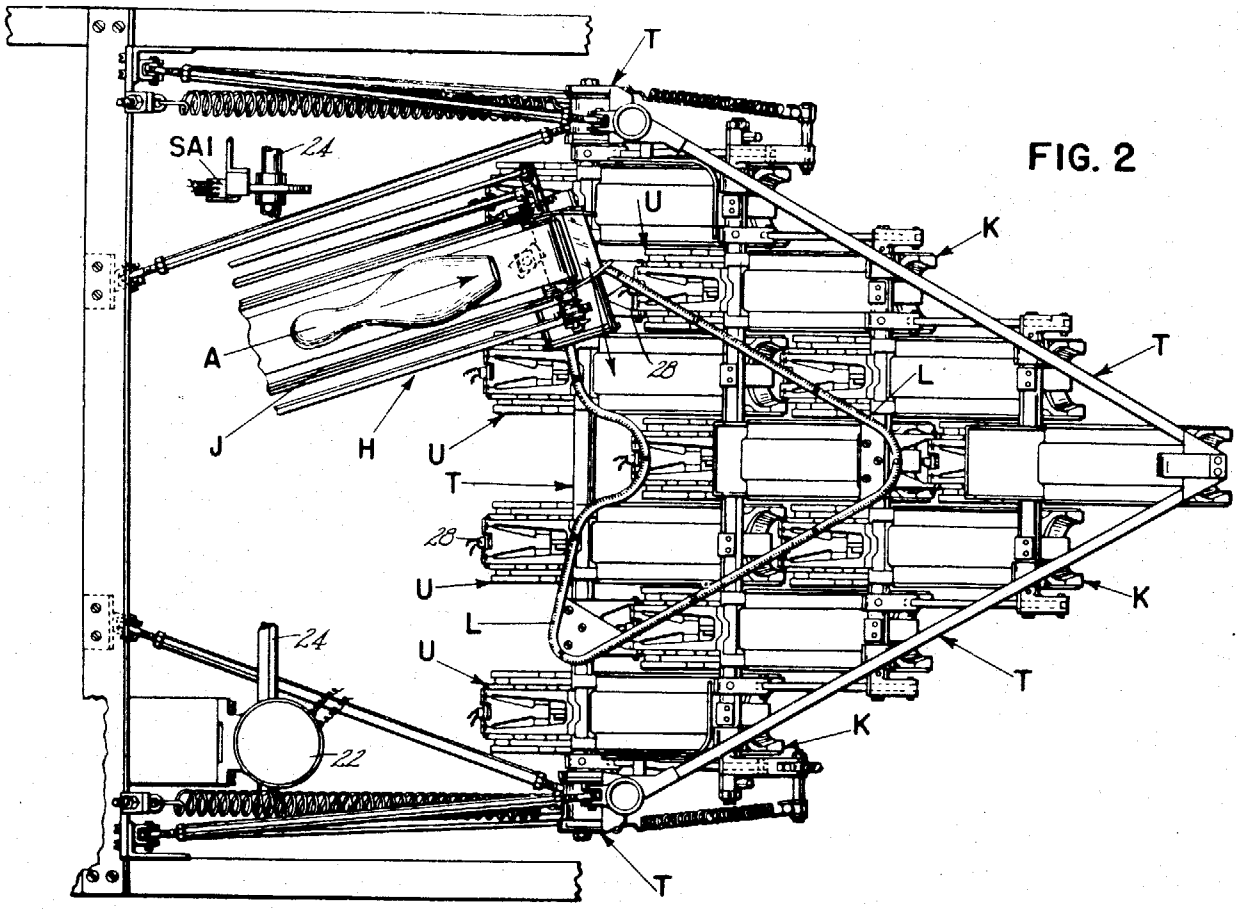

For a better understanding of the invention, together with other and further objects thereof, reference is made to the following detailed description taken in connection with the accompanying drawings, in which:

FIG. 1 is a side elevation of a bowling pin spotting machine constructed in accordance with the invention, FIG. 2 is a plan view illustrating the spotting and respotting mechanisms of the machine, FIG. 3 is a schematic circuit diagram illustrating a preferred form of the novel electric pinfall totalizng system in accordance with the invention, FIG. 4 is a schematic view of a timing device and associated cam operated switch, FIG. 5 is a schematic view of a cam operated switch which is actuated in response to the rotation of the sweep operating shaft, and FIGS. 6, 7 and 8 are schematic views of cam operated switches which are actuated in response to the rotation of the table operating shaft.

The present invention is adaptable for use with any known automatic pin setting machine of the type which has a table for spotting and respotting pins, a sweep for sweeping fallen pins from the alley and mechanism for operating the units in proper synchronism and in accordance with the various cycles required by the rules of the game of bowling.

In order to fully disclose a preferred form of the invention, it will be described in association with an automatic pin setting machine of the type shown in FIGS. 1 and 2. The machine illustrated therein, with the exception of the novel pinfall totalizing system of the present invention, is similar in construction and operation to that disclosed in copending application, Serial Number 412,-187 for Bowling Pin Spotting Machine Control Mechanism, filed Feb. 24, 1954 by Roger E. Dumas, now Patent No. 2,890,886. The mechanism illustrated for removing pins from the pit to the bowling alley is also similar in construction and operation to that disclosed in Zuercher et al. Patent 2,767,983 for Bowling Pin Elevating Mechanism. Operatively associated with the distributing mechanism is a bowling pin spotting and respoting device, which may be similar in construction and operation to that illustrated and described in Holloway et al. Patent 2,781,195 for Bowling Pin Spotting and Respotting Mechanism. These mechanisms which form coacting and selectively actuated parts of the bowling pin spotting machine are controlled by a suitable control mechanism such as that disclosed and described in copending application Serial Number 619,343, filed Oct. 30, 1956 by Roy E. Blewitt, Jr. for Bowling Pin Spotting Machine, in such manner that all sequential and cyclical operations of the machine take place in proper timed order, when spotting and respotting pins upon the playing bed of alley B during the entire course of play of a game after each normal two-ball frame, or after a strike, or when a foul is rolled.

As shown in FIG. 1, bowling pins A when struck by a ball, fall from or are removed from alley B and gutters C by means of a sweep and guard designated generally as S. The mechanism for actuating sweep and guard S is operated after each ball is rolled by a bowler. After the ıst ball of a frame is rolled, all pins either standing or ıllen are swept into pit P.

In the illustrated embodiment, pins falling from alley or delivered into pin P drop onto a conveyor designated ɜnerally as E, similar in construction and operation to ıat disclosed in Zuercher et al. Patent 2,767,983 for owling Pin Elevating Mechanism and Dumas Patent ,821,395 for Control Mechanism for Bowling Pin Spotng Machine. This conveyor is pit wide, and continually ı motion, whereby pins are moved out of pit P and devered to pin elevating mechanism F. Bowling balls ropping upon conveyor E roll and are carried downardly by conveyor E to one corner of pit P for delivery ıerefrom by suitable ball lifting mechanism (not shown) nto a return runway of conventional design (not shown) ɔr return to a bowler.

Pins A are delivered from conveyor E into pockets ɔrmed in the rim of a rotary disc G of pin elevating ıechanism F. Disc G is mounted for rotation on a horiɔntal shaft and driven by a suitable arrangement of ulleys and belts by means of a motor 10. The pins A re carried upwardly by disc G to a position which is subantially directly above pit P where each pin A is disharged into a pin distributor generally indicated as H. ı the illustrated embodiment, disc G is divided into seven in holding conveying pockets and is constructed and perated in the same general manner as the mechanism ıown and described in Zuercher et al. Patent 2,767,983 ɔr Bowling Pin Elevating Mechanism. Distributor D hich includes an elongated, telescopic, generally Uıaped chute J, is mounted or lateral movement back nd forth across the machine being guided by a heartıaped track L, and also for vertical movement. This arıngement makes it possible to deliver pins A in succeson from pin elevating mechanism F and selectively into ɔotters K on table T not only when table T is stationary, ut also as it is moving to and from alley B. Pin spotters are mounted in substantially triangular arrangement on ıble T, a pattern conforming with the conventional arıngement of pins on a bowling alley.

Table T, which is supported in a suitable frame, is ıoved in a controlled and selected manner to and from lley B whenever pins are to be spotted or respotted ıereon. As shown, table T is generally triangular in ɔrm and supports ten triangularly arranged spotters K, nd ten complementary respotter units U. It is so ıounted and stabilized that it is maintained in a subantially horizontal, parallel relationship with alley B at ll times. Table T is moved to and from alley B by ıeans of motor 26 which is selectively operated in order ɔ spot and respot pins on the alley as the play of the ame proceeds from frame to frame.

After each ball is rolled, sweep S is operated in proper med relation with the movements of table T to sweep eadwood or fallen pins from the alley, or to sweep eadwood and unwanted pins from the alley depending pon which ball of a frame is rolled. In operation of ıe machine, sweep S, which also operates as a guard ıechanism, is set in motion when a ball rolled by the layer lands in pit P of the alley B and effects the closing f a pit switch 20, which is mounted adjacent a ball imact cushioning device M. The closing of pit switch 0, when cushioning device M is urged rearwardly by ıe impact of a ball thereon, effects the starting of sweep riving motor 22 (FIGS. 2 and 3), which in turn causes a ıaft 24 to start rotating in the direction of the arrow ıown in FIG. 2, and sweep S begins its downward moveıent into operative guarding and sweeping positions adjaɜnt alley B.

Each cycle of operation of the machine requires one ɜvolution of shaft 24. A cam operated switch, indicated ɜnerally as SA1, is mounted upon shaft 24 and is adapted ɔ be actuated at selected intervals during rotation of ıaft 24. Cam switch SA1 forms a part of the electrical pinfall totalizing circuit shown in FIG. 3 and described hereinafter.

Motor 26 is mounted on a cross member of the machine frame, FIG. 1, and is provided with a conventional gear reduction driving mechanism connected to table T which causes the table to be lowered and raised in respect to alley B for spotting and respotting pins thereon. Each spotter K is attached to a bracket on table T which, in turn, is movably attached to an operating shaft which is adapted to be rotated by motor 26 during the spotting operation. The operating shaft for the spotters is provided with a suitable mechanism so that when pins are to be spotted on alley B, all of the spotters K are swung from an inclined, pin receiving and supporting position, shown in FIG. 2, into a substantially vertical pin delivering position and pins are deposited thereby on alley B when table T is moved by motor 26 and associated driving means into a lower or pinspotting position relative to the alley. As the pin spotting units K and respotting units U and the operating means therefor form no part of the present invention, reference is made to Holloway Patent 2,781,195 for Bowling Pin Spotting and Respotting Mechanism for a full description and showing of the spotters K and respotters U and the apparatus for operating them.

As shown in Fig. 1, each respotting unit U is provided with a pair of grippers designated generally as N which have mechanical linkage means associated therewith to actuate a normally closed switch 28, similar to the type shown in FIG. 10 and identified by reference numeral 236 of copending Dumas application, Serial Number 412,187, filed February 24, 1954, for Bowling Pin Spotting Machine Control Mechanism, when a pin is gripped by grippers N. Switch 28 has normally closed contacts 28a and normally open contacts 28b. The action of the grippers is such that when table T is lowered after the rolling of the first ball of a frame, and any pins are left standing on alley B, the heads of such pins will be engaged by the grippers and continued downward movement of table T results in concurrent inward movement of the grippers N to grip on or off-spot standing pins.

The contacts 28a are connected in series so that whenever a pin is gripped by a gripper N, its associated switch 28 is operated to break the series circuit connecting the ten switches. Contacts 28a form a part of the master electrical control circuit for controlling the several cycles of the machine. Contacts 28a also act as sensing devices for electrical mechanism which indicates to the bowler, the pins remaining standing after each ball of a frame is rolled and for showing which ball of a frame is to be rolled and for indicating the occurrence of a strike. Such a circuit with associated indicating lights may generally be of the kind shown and described in detail in copending Dumas application, Serial Number 412,187, filed February 24, 1954 by Roger E. Dumas for Bowling Pin Spotting Machine Control Mechanism. Each switch 28 also has a set of normally open contacts 28b associated therewith which form a part of the pinfall totalizing circuit of the present invention. Their purpose and operation is described in more detail hereafter.

When bowling pins are to be spotted on alley B, a solenoid 30 is energized. This solenoid rocks associated bell-crank lever and other mechanical linkage generally designated as Q and causes spotting units K to move from an inclined to a substantially vertical position when table T is located in position III as indicated in FIG. 1, thereby resulting in the delivery of ten pins in spotted arrangement on alley B. Solenoid 30 is energized in proper sequence in the machine cycles by the master control circuit.

Table drive motor 26, through the mechanical linkage mentioned hereinabove, rotates a main driving shaft 32 which, in turn, drives the spotting and respotting units. Several cam operated switches generally indicated as TA1, 2 and 3 (FIG. 1), described in more detail hereinafter, are mounted on shaft 32 and form a part of the pinfall totalizing circuit of the present invention.

An important feature of the present invention resides in the provision of means for causing the table to descend after a second ball of a frame has been rolled, search for standing pins and then reverse and retrace its path of travel to return to zero or "at rest" position. The table reversing operation is completed before sweep S operates to remove deadwood and unwanted pins from alley B. By reversing the table in this manner, information is provided as to the number of pins knocked down after the rolling of the second ball.

The normal first ball cycle is in no way modified by the scoring system of the present invention. However, as the table completes approximately 160° of its first revolution in its course of travel to pick up any standing pins, the scoring system will count the pins standing, subtract the number thus obtained from 10 and indicate on a remote viewing mask a number which will represent the pins knocked down by the first ball. Upon completion of the first ball cycle, a lamp, designated as the first ball light and similarly positioned on a viewing mask will be extinguished and a second lamp, designated as the second ball light and positioned on the viewing mask will light. The information as to the pins knocked down by the first ball will remain on the mask throughout the second ball cycle.

The second ball cycle of the conventional pin setting machine is modified as mentioned above to provide for moving the table down to contact any standing pins in order to totalize the pins knocked down after the second ball has been rolled. In a normal second ball cycle, the sweep drops to a guard position and after a slight time delay knocks all standing pins and deadwood from the pin bed and onto the pit floor where the pins are elevated and distributed as described hereinbefore. Upon completion of the sweepthrough operation, the table spots a full set of pins whereupon both the sweep and the table return to their zero positions. In accordance with the pinfall totalizing system of the present invention, the sweep drops to its guard position adjacent the alley bed upon the rolling of a second ball. After the completion of a short time delay, the table starts in a downward motion towards the alley to feel for standing pins. Upon reaching approximately the 160° point in its revolution cycle where all standing pins have been contacted by their respective grippers but not locked therein, the table stops, reverses its motion and returns to its zero position. When its zero position has been reached, the sweep starts its runthrough to clear all standing and deadwood from the pin bed and the table spots a new set of pins. At the point where the table reverses its direction during the second ball cycle, the second ball counter will read the total number of pins knocked down. Due to the nature of the information obtained as to the total number of pins knocked down by the second ball, the occurrence of a spare may be determined and indicated on the remote viewing mask.

The pinfall totalizing system will now be described in more detail in connection with FIG. 3 which shows the electrical circuitry of the system in schematic form. In general, a stepping relay SR1 is employed to develop the program required for the several sequences of operation necessary to indicate and totalize the pinfall resulting each time a ball is rolled. This stepper relay is substantially identical in construction to that described in detail in copending Dumas application. Serial Number 412,187 and copending Blewitt application, Serial Number 619,343. In the stepper relay illustrated in FIG. 3, two levels of contacts are used and are accordingly designated I and II.

Although a separate stepping relay is employed to provide the two levels of contacts, the levels may be incorporated in the main control stepper relay shown and described in the aforementioned Dumas and Blewitt copending applications. In that case, level I of FIG. 3 would not be needed since its primary function is to serve as a driving motor operating intermittently and in proper sequence with the movements of the table sweep to selectively energize and deenergize the contacts of level II. In fact, as the connections to the contacts of level I (FIG. 3) and the functions thereof are substantially similar to those of level V of the stepping relay shown in the aforementioned copending Blewitt application, the stepping relay and associated circuitry of the invention described in that application may be easily modified to accommodate the additional circuitry of the pinfall totalizing system shown in FIG. 3, in order to provide both a combined control and pinfall totalizing system.

Each level of stepping relay SR1 is provided with a home or zero contact and ten contacts corresponding to successive positions of conventional rotary wiping arms. Any type of stepper relay construction may be used so long as it provides means for repetitive cycling of eleven contacts (0, 1–10). It will be noted that the wiper arm of level I is of the non-bridging or open-circuiting type whereas the wiper arm of level II is of the bridging or short-circuiting type. The wiper arms are physically ganged together so that like contacts of each level are wiped by their respective arms. Each level of contacts and its associated wiper arm selectively controls the operation of particular elements of the pinfall totalizing system.

Power for the system is furnished from a conventional commercial source of voltage, such as 110 v. 60 cycles, supplied to the primary winding 34 of the transformer 42 through power lines 36, 38 and switch 40. Transformer 42 is adapted to supply the proper control voltages to the various control elements of the system. Winding 44 of transformer 42 is connected to a pair of diode rectifiers 46 which are connected in a conventional full wave rectifier circuit in order to provide D.C. to the circuit elements where required. Transformer winding 44 is center tapped and is connected to a common chassis ground to provide a conventional return path for the full wave rectifier circuit. Windings 48 and 50 of transformer 42 are used to provide a source of heater and electrode voltages, respectively, for electronic valve 52 whose purpose will be described in detail below.

Stepper relay SR1 is diagrammatically shown in FIG. 3 as having an actuating coil 54, associated with level I which opens and closes a normally closed contact 56 in a conventional manner during each step of the switch so that the switch will move forward only one position for each impulse received by coil 54. A suitable resistor and capacitor 58 and 60, respectively, are connected in series across normally closed contacts 56 to aid in repressing any arcing of the contacts during the stepping operation.

The various circuit elements comprising the pinfall totalizing system and their cooperative relationship to each other will now be described in connection with a description of the operation of the system in accordance with the several operative cycles of the pinsetting machine.

First ball cycle

The bowler rolls the first ball of a frame which, upon arriving in pit P (FIG. 1), strikes cushioning device M and moves it rearwardly to engage and actuate starting switch 20 suitably mounted at the rear of device M. The closing of the contacts of switch 20 establishes a circuit which energizes solenoid 54 of stepper switch SR1 causing it to advance the wiper arms of levels I and II one step, inasmuch as they are both mechanically ganged together. This circuit, beginning with the center tap of winding 44, includes line 66, pit switch 20, step "0" of level I, the interrupter contacts 56 of stepper relay SR1, solenoid coil 54, line 62, and the center tap of rectifiers 46, which constitutes the positive terminal of the D.C. power supply. As a result of the energization f stepper relay SR1, the contact fingers are advanced to ep or position 1 of their respective levels. The intermittent actuation of stepper relay SR1 to cause its wiping rm to move from one contact to another through a comlete cycle of ten contacts is sequentially synchronized ith the operative movements of the machine as the ame progresses, by means of cam operated switches SA1 nd TA1, 2 and 3 mounted on the sweep and table drive haft, respectively. Cam switches SA1 and TA1, 2 nd 3 are shown in more detail in FIGS. 5, 6, 7 and 8.

Actuation of pit switch M also places in operation ie main or master control circuit for the machine (not iown) so that the sweep S is caused to move from its pper or "dwell" position and begins to descend to its ower or "guard" position adjacent alley B as shown in roken lines in FIG. 1. After approximately 30° of otation of the sweep shaft 24, the sweep cam 64 (FIG. ) of the switch SA1 closes normally open contacts A1a so that the stepper relay SR1 is advanced from osition 1 to position 2 through a circuit consisting of ne 66, contacts SA1a, contact 1 of level I, interrupter ontact 56 and solenoid coil 54 to line 66. While the tepper is being stepped from position 1 to position 2, ie sweep continues its downward motion and descends ntil it reaches its lower or guard position adjacent alley which may be identified as the 76° point on a cam 4 of sweep switch SA1. The sweep motion is stopped y the master machine control circuit at this point which orresponds to the guard position.

Simultaneously with the advancing of the stepper relay 4 to position 2, a timer motor TM1 (FIG. 4) is energized y the master control circuit by means of an additional am on sweep shaft 24 or contacts on the master mahine control circuit stepper relay or by any other suitble means. However, on all known bowling pinsetting iachines, some form of time delay device is provided delay the downward movement of the table T after ie first ball of a frame is rolled in order to allow time or standing pins to come to an equilibrium position. In ie Dumas application, Serial Number 412,187, the timig device comprises an electronic valve circuit whereas the Blewitt application, Serial Number 619,343, the ming device is a conventional synchronous clock-type iotor which is adapted to run at substantially the same peed as the table driving shaft 32.

For purposes of illustrating the present invention, a ming motor, such as is employed with the master conol circuit described in copending Blewitt application, erial Number 619,343, is illustrated in FIG. 4 and has cam 66 with a selected contour which is adapted to pen and close normally open contacts TM1a and norially closed contacts TM1b respectively. After the weep has reached at least its 30° point, timer motor M1 is energized to define the beginning of the time dey interval required to delay the downward movement of ible T. After approximately 2¼ seconds, the timer iotor TM1 operating through cam 66 causes contacts M1a to close and contacts TM1b to open.

Upon the closing of contacts TM1a, stepper relay SR1 f the pinfall totalizing circuit is advanced from posion 2 to position 3 through a circuit including line 66 f contacts TM1a, contact 2 of level I, interrupter conict 56 of relay SR1, solenoid coil 54, to the positive ne 62. After the 2¼ second waiting period has run, the iaster machine control circuit causes the table to descend t the beginning of its first revolution.

As table T descends into pin gripping position relative pins left standing on alley B after a ball has been olled, grippers N of respotting units U are moved autoiatically to gripping position to grip any pins left standig for lifting and respotting. At approximately 160° f table revolution, searching and counting of standing ins commences. If there is at least one standing pin, ien contacts 28b of switch 28, associated with the respotting unit U corresponding to such pin, will be closed, thus providing information to associated electrical circuitry, described in more detail below, of the presence of standing pins.

The completion of the first ball cycle is in accordance with the conventional sequence of operations for a pin setting machine. That is, the table will pick up all standing pins and complete its first revolution and proceed with the respotting operation which occurs during its second revolution. In the meantime, the sweep will remove all deadwood from the alley. During its second revolution the table will replace the standing pins on alley B and both the table and the sweep will return to zero position to await the rolling of the second ball.

When the table arrives at the 160° position during its first revolution, as mentioned above, cam switch TA2 which has a cam 68 mounted on shaft 32 in juxtaposition to cam switch TA1, closes contacts TA2a (FIG. 6) thereby energizing relay coil PR6 through normally closed contacts PR14a of relay PR14.

Relay PR6 then holds itself in an energized condition through the closing of its contacts PR6a which are connected in parallel with contacts PR14a. Energization of relay PR6 also actuates several other associated contacts. Normally closed contacts PR6b are opened so that a bias voltage supplied by a bias supply comprising rectifiers 68, 70, capacitors 72, 74 and winding 50 of transformer 42, is removed from the control electrode of electronic discharge device 52. Contacts PR6c also close to partially complete an energizing circuit for actuating coil 76 of a second stepping relay generally indicated as SR2. Stepper relay SR2 is similar in design and construction to stepper relay SR1 in that it has a plurality of contact levels, with each level having at least ten contacts. The first level of contacts of stepper relay SR2 is connected to the ten sensing switches 28b. Its operation will be described in more detail hereinafter.

Upon the removal of the control grid bias from discharge device 52, anode current flows therethrough to energize the relay K1 which is connected to a source of positive voltage supplied by transformed winding 50, rectifier 70 and capacitor 74. Discharge device 52 also has a resistor 78 connected between its cathode and ground to limit the anode current flow when the bias is removed from its control grid. A resistor 80 is connected to the control grid of discharge device 52 to provide a ground return path therefor.

Energization of relay K1 causes contacts K1a to close and complete the energizing circuit for the actuating coil 76 of relay SR2. The energizing of coil 76 causes a pair of normally open, interrupter-type contacts 82 associated with the actuating arm of stepper relay SR2 to close and reapply the negative bias to the control grid of discharge device 52, causing it to cease to conduct. Relay K1 is then deenergized, its contacts K1a are opened and coil 76 of stepper relay SR2 is deenergized. As stepper relay SR2 is preferably of the type with a ratchet and pawl advancing movement, its actuating arm moves forward to engage a succeeding contact whenever its energizing coil 76 has passed through a cycle of energization and deenergization.

Therefore, when the contacts K1a open, the actuating arm of level I of relay SR2 is moved from zero position to its #1 position. When the actuating arm arrives at the position #1 the interrupter contacts 82 again open and again remove the negative bias from the control electrode of discharge device 52. This action again causes the contacts K1a to close and reenergize actuating coil 76. The energizing of coil 76 causes interrupter contacts 82 to close and reapply a bias to discharge device 52, which then opens contacts K1a and allows actuating arm of level I of stepper relay SR2 to advance to position 2. This periodic advancement of stepper relay SR2 continues until it has stepped from its zero position through steps 1 to 10 and returns to zero position.

Conventional stepping relays usually have a cam associated with the movement of the various contact level arms which closes or opens one or more switches whenever the actuating arms movement from the zero or normal position. In the case of stepper relay SR2 which is of this type, a pair of normally open contacts 84 and a pair of normally closed contacts 86 are respectively closed and opened whenever actuating arm of relay SR2 is away from its zero or normal position.

It will be noted that contacts 84 are in parallel with contacts PR6c and contacts 86 are in series with contacts PR6b. The cam contour of cam 68 of table switch TA2 is such that relay PR6 is energized for substantially only 20° of the table revolution cycle or approximately .3 of a second, as the table proceeds from the 160° to 180° points in its revolution cycle. However, once the actuating arm of stepper relay SR2 has moved away from its zero position, then even though contacts PR6c open with deenergization of relay PR6, their function is performed by closing of contacts 84 of relay SR2. Likewise, contacts 86 of relay SR2 are opened when the actuating arm has traveled away from zero position so that closing of contacts PR6b upon deenergization of relay PR6 prevents bias from being applied to discharge device 52, except when normally applied by closing of contacts 82 as described above. It will be seen that once the stepper relay has begun its periodic self-energization cycle through steps #1 to #10, the operation is continued through its own holding circuits provided by contacts 84, 86. When the actuating arm returns to zero, contacts 84 will oven and contacts 86 will close, stopping the stepping cycle and reapplying negative bias to device 52.

As the actuating arms of the two levels of relay SR2 move through the designated ten steps and return to their zero position as described above, the sequential closing of the contacts of level I performs a "searching" operation of the ten gripper cell switches 28b to ascertain which, if any, of these switches are in closed position because of the presence of standing pins. When the table grips and raises standing pins in order to allow the sweep to run across the alley bed B and clear deadwood, pin indicating lamps 88 (1–10) light and indicate to a bowler the position of pins remaining standing, in the same manner as described in copending application, Ser. Number 412,187, filed February 24, 1954 by Roger E. Dumas for Bowling Pin Spotting Machine Control Mechanism or Patterson Patent 2,338,733.

The circuit for lighting the pin indicating lamps comprises winding 90 of transformer 42, contacts 3, 4 and 5 of level II of stepper relay SR1, lamps 38 with their respective rectifiers 92 and their respective gripper cell switches 28b. When the contacts of level I of stepper relay SR2 open and close in sequence as the relay searches for closed switches 28b, a third stepper relay SR3, referred to hereinafter as the first ball count stepper relay, is advanced one step for each closed switch 28b through a circuit comprising switches 28b (1–10), their mating contacts 1–10 of level II of search stepper relay SR2, rectifier 94, normally closed contacts PR15a, normally closed contacts PR12a, actuating coil 96 of first ball count stepper relay SR3 and contacts K1a. In this manner, the first ball count stepper relay SR3 will advance one position for each closed switch 28b. The contacts 1–10 of level I of relay SR3 will therefore close in sequence for each step of the first ball count stepper relay SR3 to partially complete a circuit for each one of the lights 0–9 connected between each one of the contacts 1–10 and the common ground connection. It will be noted that the actuating arm of level I of relay SR3 is advanced only one step for each closed switch 28b. Therefore, it will remain stationary on a contact equal to the total number of closed switches 28b even though stepper relay SR2 advances through all ten positions and returns to zero.

Rectifiers 92 and 94 in the pin indicating circuit allow a low A.C. voltage, provided by winding 90 of transformer 42, to light lamps 88 while preventing the D.C. control voltage supplied by winding 44 and rectifiers 46 from energizing these lamps.

Level II of stepper relay SR2 has a contact 98 which is normally closed when the actuating arms of stepper relay SR2 are in zero position. Contact 98 is connected between the actuating arm of level I of stepper relay SR3 and the source of A.C. control voltage supplied by winding 90 of transformer 42. Therefore, when search stepper relay SR2 moves from its zero position to start its search, contact 98 opens and thus removes the voltage source from the actuating arm of level I of relay SR3 to prevent any of lamps 100 from lighting. After search stepper relay SR2 has completed its search and first ball count stepper relay SR3 has advanced one step for each standing pin, level II of SR2 returns to its zero position and closes contact 98 which reapplies power to the actuating arm of level I of SR3. The first ball pinfall count totalizing lamp 100, corresponding to the position to which first ball count stepper relay SR3 has advanced is lighted accordingly. The lights are designated in a reverse order to the contact positions of level I of SR3 since they are intended to indicate the total number of pins knocked down by the first ball. However, it will be understood that the lights may be so designated as to indicate the total number of pins which remain standing after a first ball has been rolled. When relay PR6 was energized at the 160° point in the table revolution cycle by closing of cam switch TA2a, normally open contacts PR6d were also closed, thereby energizing the latching coil PR14L of a conventional latching type relay. This action opens normally closed contacts PR14a connected in parallel with contacts PR6a, to prevent the energizing of relay PR6 by the closing of the contacts TA2a of cam switch TA2 during the second or respot revolution of the table in the first ball cycle.

During the period stepper relay SR2 searches for standing pins and advances first ball count stepper relay SR3, the table continues to run and passes the 180° point, deenergizes relay PR6, and continues to travel on its upward ascent toward the 360° position in its first cycle of rotation. During this period, the timing device TM1 associated with the main control circuit of the machine continues to run. After approximately 6 seconds have elapsed, it completes one revolution of its cam and returns to its zero position to allow contacts TM1b to close. Closing of these contacts completes a circuit including line 66, contact 3 of level I of stepper relay SR1, the interrupter contacts 56, coil 54 to line 62, thereby stepping relay SR1 from position 3 to position 4.

In the meantime, the sweep moves from its guard position, "runs through," and clears deadwood from the alley. When the sweep has completed its "run through" and returned to its forward position which is approximately 270° from the start of the sweep revolution, cam switch SA1 has rotated sufficiently to close contacts SA1a, thereby causing stepper relay SR1 to advance from position 4 to position 5 through a circuit including line 66, closed contacts SA1a, position 4 of level I of stepper relay SR1, interrupter contacts 56, coil 54, to line 62. Meanwhile the table continues to run on position 4, and passes through its zero or home position with respect to the table actuating shaft 32. By the time the stepper relay SR1 has advanced to position 5, the table T has started its second revolution which ultimately places standing pins back on the alley bed. When the table reaches approximately the 260° point in its second revolution, stepper relay SR1 is stepped from position 5 through position 6 to position 7 through a circuit including line 66, contacts TA1b of table cam switch TA1, the contacts of position 5, normally closed contacts PR3e, the contacts of position 6, interrupter contacts 56, coil 54 to line 62. The table continues its upward movement until it reaches its 360° position whereupon the master control circuit stops its further movement. The sweep also rises from its forward or guard position to its zero position on step 7 where its motion is also stopped by the master control circuit.

When stepper relay SR1 moves to position 6, the unlatching coil PR14u of latching relay PR14 is energized through position 6 of level II of stepper relay SR1, closing normally closed contacts PR14a and preparing relay PR6 for subsequent energization in the next succeeding cycle. The totalizing circuit is thus conditioned for operation during the second ball cycle. On position 7 relay PR12 is energized through contacts 7 of level II of stepper relay SR1 and contacts 102, which are a pair of switch contacts operated by the cam associated with relay SR1, and closed when the actuating arms of relay SR1 are off their zero positions. When PR12 is energized, it opens normally closed contacts PR12a and deenergizes lamp 104 to turn off the first ball indicator light. Relay PR12 holds itself in for the completion of the second ball cycle by closing normally open contacts PR12b. Lamp 106, indicating that the machine is ready for a second ball cycle, is now energized through step 7 of level II of stepper relay SR1 and the normally closed contacts PR4a of relay PR4.

Second ball cycle

When the second ball rolls against the cushioning device M, the contacts of pit switch 20 are closed. This completes the circuit consisting of line 66, contacts 20, contacts 7 of level I of stepper relay SR1, interrupter contacts 56, coil 54, to line 62. The actuating arms of stepper relay SR1 then move to position 8. Meanwhile, in response to the closing of pit switch 20, the master control circuit causes the sweep to start its downward motion. When the sweep reaches 30° of its rotational cycle, cam switch SA1 actuates contacts SA1a so that stepper relay SR1 is advanced to step 9 through a circuit including line 66, contacts SA1a, contact 8 of level I of relay SR1, interrupter contacts 56, actuating solenoid coil 54, to line 62.

According to the American Bowling Congress rules for playing the game, after the second ball is rolled, the sweep normally sweeps all pins from the alley bed and into the pit after a short time delay of 2–3 seconds has elapsed, to allow wobbling pins to assume a stationary position. All pins are swept from the alley bed regardless of whether or not any are standing. After the sweep has "run through," the table normally descends and spots a new set of pins on the alley in preparation for the rolling of a first ball of a new frame.

However, in order to totalize the number of pins knocked down after a second ball has been rolled, it is necessary to stop the action of the "sweep through," cause the table to descend to the alley, feel for standing pins, reverse its direction and then to ascend to its normal or zero position. After these movements have taken place, the sweep completes its "run through" and the table will descend as in normal operation. During the time that the table feels for standing pins yet does not remove them from the alley but proceeds upward to its zero position, the number of pins knocked down may be totalized. Electrical circuitry for carrying out these operations will now be described.

When the actuating arm of level II of stepper relay SR1 is advanced to position 9, a time delay relay TR1 is energized through a circuit comprising contacts 9 of level H of stepper relay SR1, normally closed contacts PR11a, normally closed contacts PR16a, the coil of time delay relay TR1 and normally closed contacts R1a of motor reversing device R1. To prevent progression of stepper relay SR1 from step 9 to step 10 through the normal closing of contacts TM1a of timer motor TM1, the time delay of relay TR1 should necessarily be a fraction of a second less than that of the delay period of timer motor TM1. Thus, if the time delay of relay TR1 is set, for example, at 2⅛ seconds, then normally closed contacts TR1a, connected between contacts 2 and 9 of level I of stepper relay SR1, are opened, thereby preventing contacts TM1a from closing and stepping the actuating arm of level I of relay SR1 from position 9 to position 10. Simultaneously with the opening of TR1a upon the energization of relay TR1, contacts TR1b are closed, tehreby energizing table motor 26, which in turn causes the table to descend towards the alley floor. It will be understood that table motor 26 is normally actuated by circuitry associated with the master control circuit. However, in order to simplify the description of the invention, such circuitry is not shown here while the normal control line from the master control circuit to motor 26 is indicated only generally as line 108. During the period when motor 26 is being controlled by operation of relay TR1, line 108 is inactivated by the master control circuit.

So that the master control circuit will not continue to program a normal second ball cycle during the second ball pin sensing the table reversal period, a pair of normally closed contacts TR1c are provided. These contacts which open when TR1 is energized may be connected at any convenient point in the master control circuit where their opening will halt the operation of the machine. For example, they may be used to incapacitate the timing device normally provided to delay table descent, until after standing pins have stopped wobbling, as disclosed in copending Blewitt application, Serial Number 619,343, filed October 30, 1956, for Bowling Pin Spotting Machine, and copending Dumas application, Serial Number 412,187, filed February 24, 1954, for Bowling Pin Spotting Machine Control Mechanism.

When the table has reached a 160° position, a cam operated switch TA2b (FIG. 8) provides an energizing impulse for reversing device R1 which causes motor 26 to reverse its direction. Reversing device may be any known motor reverser of the type which reverses the direction of a motor upon receiving an impulse from an external control source. When motor reverser R1 is actuated, contacts R1a associated therewith and connected between one end of the coil of relay TR1 and ground are opened and remain open until power is removed from reversing device R1 by the opening of contacts TR1b. When motor 26 reverses its direction, it causes the table to ascend and approach its zero position whereupon a cam. TA3 operated by table cam shaft 32 and having an actuating lobe extending between 1° and 180°, opens its contacts TA3a connected in parallel with contacts R1a and deenergizes time delay relay TR1. This action removes power from motor 26 by opening contacts TR1b and also incapacitates reversing device R1. Motor 26 then, is again controlled in a normal forward direction by line 108 from the master control circuit. As soon as the table returns to its zero position and relay TR1 is deenergized, normally closed contacts TR1a close and allow timer motor contacts TM1a to step relay SR1 from step 9 to step 10 through a circuit comprising line 66, contacts TM1a, contacts TR1a, contact 9 of level I of stepper relay SR1, interrupter contacts 56, actuating solenoid coil 54, to line 62.

When the table reaches the 160° position at which it reverses its direction, the standing pins will be contacted by their respective grippers but the grippers will not lock. However, switches 28b corresponding to their respective standing pins will be closed, and may be searched as described in connection with the first ball cycle, to ascertain the total pins still standing. Also, at the 160° point, relay PR6 is energized by the closing of table cam switch contacts TA2a which completes the circuit comprising these contacts and normally closed contacts PR14a. The energizing of PR6 again starts the searching for closed switches 28*b* by search stepping relay SR2 in conjunction with the operation of discharge device 52 and associated relay K1, as previously described in connection with the first ball cycle. As relay PR12 was energized at the beginning of the first ball cycle, a second ball count stepper relay SR4 will receive information as to the total number of standing pins and store this information.

When PR12 is energized, contacts PR12a are opened and contacts PR12b are closed. The circuit for actuating second ball count stepper relay SR4 will then comprise closed gripper switches 28b, corresponding contacts 1–10 of level I of search stepper relay SR2, rectifier 94, normally closed contacts PR16b, contacts PR12b actuating coil 110 of stepper relay SR4, contacts K1a, to the source of positive control voltage provided by transformer 42. The periodic, progressive stepping of search stepper relay SR2 by actuation of anode relay K1 is the same as described heretofore when relay SR2 performed the searching operation during the first ball cycle. Accordingly, the number of pins knocked down is totalized and indicated by the lighting of an appropriately designated light connected between the contacts of level I of stepper relay SR4 and the common ground connection.

As in the case with stepper relay SR3, the actuating arm of relay SR4 advances one position for each switch 28b found to be closed during the search operation performed by stepper relay SR2. The lamp 112, connected to the contact to which the actuating arm of level I of stepper relay SR4 is farthest advanced after SR2 has completely swept through its ten contacts and returned to zero, is lit when contact 98 is actuated by the zero position of level II of SR2. Lamps 112 indicate the results of substracting the number of standing pins from "10" or, in other words, the number of pins knocked down.

After the table returns to its zero position and contacts TR1a close to allow the closed contacts TM1a of timer motor TM1 to advance stepper relay SR1 to position 10, the sweep is again started by the master control circuit and proceeds from its 76° point where it has remained in a guard position while the table descended to the alley, felt for standing pins, reversed its direction and ascended. The sweep now performs its run through, sweeping all pins, whether standing or fallen, into the pit and continues to a position which is approximately 270° of rotation of the sweep driving shaft 24 where it stops again in the guard position adjacent alley B. In accordance with the conventional operation of the machine, the table starts its spotting cycle in which ten pins are placed upon the alley B after the sweep has completed its "run through." When the table drive shaft 32 has revolved approximately 260°, the switch actuating lobe on table cam switch TA1 closes contacts TA1c to advance stepper relay SR1 to its zero position through a circuit comprising contacts TA1c, step 10 of level I of relay SR1, interrupter contacts 56, actuating solenoid coil 54, to the source of actuating voltage by means of line 62. When the actuating arms of stepper relay SR1 reach their zero positions, contacts 102 open and deenergize relay PR12. It will be remembered that contacts 102 are opened only on the zero position of SR1 by a cam operating in association with the movement of the actuating arms. Second ball light 106 is then turned off through opening of contacts PR12b and first ball light 104 is turned on through the closing of contacts PR12a.

The machine, the master control circuit therefor, and the pinfall totalizing circuit of the present invention are all now at zero, awaiting the rolling of the first ball of the next frame. Upon receipt of this next ball, relay PR13 connected to the contacts of position 1 of level II of stepper relay SR1 is energized when relay SR1 is stepped from zero to position 1 upon closing of pit switch 20 as described hereinbefore. Closing of contacts PR13a unlatches relay PR14 by energizing latch relay coil PR14u. Normally closed contacts PR14a then reclose, placing relay PR6 in condition for actuation, and preparing the counting circuit for the first ball count. Closing of contacts PR13b and PR13c and PR13d, connected in counting relay circuits, "zero" both the first and second ball count stepper relays SR3 and SR4, through their own zeroing and interrupter contacts 114, 116, and 118, 120, respectively. Contacts PR13d are in parallel with contacts K1a to provide a connection between the source of position control voltage and the count stepper relay circuits during the "zeroing" operation. Zeroing contacts 114 and 118 are similar in operation to contacts 102 of stepper relay SR1 in that they are open only at the zero position of their respective stepper relays but are closed during the traversing of steps 1–10.

First ball foul

When a foul is committed on the rolling of the first ball of a frame, foul detector relay PR3 will be energized by the receipt of a signal from an automatic foul detecting and signalling unit 122 indicated only in block schematic form, which may be any of the known foul detecting mechanisms. For example, a suitable foul detecting mechanism is shown and described in Dumas et al. Patent 2,683,602 for Foul Detecting and Signalling Mechanism. Although a foul has occurred, the master control mechanism of the machine normally operates for a short period of time after a first ball has been rolled in the same manner as for a normal first ball cycle. Thus, the arrival of the ball in the pit causes pit switch 20 to actuate the master control circuit in a normal fashion and also causes stepper relay SR1 to advance from position 0, to position 1, to position 2 in the conventional manner, since even though a foul is committed, sweep S will move from its dwell position and descend to its lower or guard position adjacent alley B and, therefore, close contacts SA1a associated with sweep cam switch SA1.

On position 2 of stepper relay SR1 the first ball foul relay PR15 is energized through a circuit comprising contacts 2 of level II of stepper relay SR1 and contacts PR3a. Relay PR15 locks itself in an energized condition through a holding circuit comprising normally closed contacts PR13e and normally open contacts PR15b. Normally closed contacts PR15a, connected between rectifier 94 and normally closed contacts PR12a, also open upon energization of relay PR15 and prevent the coil 96 of stepper relay SR3 from being actuated and thus storing a count of standing pins during the spotting revolution of the table in the first ball cycle. In the case of a first ball foul, the master control circuit of the machine will cause the sweep to move to its guard position, then "run through" and remove all pins from the alley whether standing or fallen and the table spotters K will deliver a new set of pins to alley B. The machine then readies itself for receipt of a second ball.

Relay PR15 has a lamp 122 in parallel with its coil terminals which provides an indication of a first ball foul. Therefore, lamp 122 remains lit until the coil of relay PR15 is deenergized which will not be until the receipt of the first ball of the next frame. Thus, the occurrence of a foul on the first ball will be indicated to an observer of the progress of the game throughout the second ball cycle.

Even though there is no pinfall count and totalizing after the occurrence of a first ball foul, yet stepper relay SR1 must be advanced to position 7 in order that it will be placed in a proper condition for controlling the circuits for counting and totalizing standing pins during the second ball cycle. However, until timer motor TM1 of the master control circuit closes contacts TM1a, the advancement of the stepper relay SR1 is the same as for normal first ball cycle, That is, when pit switch 20 closes upon the rolling of a ball, actuating arm of stepper relay SR1 advances in the normal manner from the zero position to position 1. It remains in this position until cam switch SA1 closes its associated contacts SA1a when the sweep has dropped to a guard position. Then stepper relay SR1 is advanced from position 1 to position 2. After timer motor TM1 has been energized by the master control circuit and has run its normal 2 to 3 seconds time delay period, contacts TM1a close and advance stepper relay SR1 to position 3 by energizing coil 54 through contacts TM1a and the contacts of position 2. As contacts PR3b, c and d connected to level I of stepper relay SR1, are closed by energization of foul detector PR3, the stepper relay SR1 advances quickly from positions 3, 4 and 5 and rests on position 6. It does not advance to position 7 as normally closed contacts PR3e are held open when foul detector relay PR3 is energized.

In the meantime, the master control circuit of the machine programs the machine through its regular first ball foul cycle. Thus, the sweep S sweeps all pins standing or fallen into pit P and returns to its 270° or guard position. The table then travels through a portion of its cycle during which spotters K deliver a new set of pins to alley B. When the table has reached approximately 260° of its first revolution, the table cam switch TA1 is again actuated and closes contacts TA1c. This energizes stepper relay SR1 through a circuit comprising line 66, contacts TA1c, the contacts of position 6, interrupter 56, coil 54, to line 62. The actuating arm of relay SR1 then moves to position 7 to await the rolling of a second ball. The table continues to move upwardly to its zero or home position whereupon its movement is stopped and the sweep, which has been adjacent the alley after it has swept deadwood therefrom, is set in motion again whereupon it returns to its dwell position and stops. The machine is now ready for the receipt of a second ball.

Second ball foul

Upon receipt of a second ball after a foul has been committed and relay PR3 is energized, pit switch 20 closes and causes the actuating arms of stepper relay SR1 to advance from position 7 to 8 and thence to 9 during the downward motion of the sweep as described above in connection with a normal second ball cycle. On step 9 relay PR16 is energized through contacts 9 of level II of contacts PR11a and closed foul detector relay contacts PR3f.

Relay PR16 locks itself in through a holding circuit comprising contacts PR13e and contacts PR16c. Energization of relay PR16 causes normally closed contacts PR16a, connected between the contacts of position 9 of level II of relay SR1 and relay coil TR1, to open and incapacitate the table reversing relay control circuit. Therefore, the table will not reverse when the 160° point in the cycle of revolution is passed, since TR1 will not be actuated. Normally closed contacts PR16b, connected between rectifier 94 and contacts PR12b, also open to prevent the second ball count stepper relay SR4 from operating. The second ball foul light 124, connected in parallel with relay PR16, is energized and remains on until relay PR16 is deenergized when the first ball of a following frame is rolled.

The operation of the machine itself upon the occurrence of a second ball foul is the same as in a normal second ball cycle. Therefore, the sweep drops to its guard position, sweeps all pins from alley B whether fallen or standing, and the table descends and spots a new set of pins. The stepper relay SR1 is advanced through positions 10 and zero by the "zeroing" circuits as described hereinbefore in connection with a normal second ball cycle.

Spare cycle

It is advantageous to the scorer that a visual indication be provided whenever a spare is made during the second ball cycle. Circuitry for providing such information will now be described. After a normal first ball cycle has been completed and the fallen pins are totalized by the first ball count stepper relay SR3, the knocking down of all the pins during the second ball cycle will cause the second ball count stepper relay SR4 to be actuated but it will not move from its zero position since all of switches 28b are open. A cam operated contact 126 of relay SR4 which is normally open from positions 1 through 10 will remain closed on the zero position. Search stepper relay SR2 will perform its normal search cycle and thereby cause its actuating arms to successively engage the ten contacts of its associated level I and II.

Only the contacts engaged by the actuating arm of level II at position 10 are connected to the spare indicating circuit. These contacts are designated as 128 to simplify the drawings. Accordingly, when the actuating arms of levels I and II of stepper relay SR2 have reached position 10, which occurs during the period that relay TR1 is energized, relay PR17 is energized through a circuit including contacts 128, closed contacts TR1c, the coil of relay PR17, closed contacts PR14b and normally closed contacts 126. It will be remembered that relay PR14 was latched by the closing of relay PR6 at the point of reversal of the table (160°). Thus, contacts PR14b are held in a closed condition during the reversal cycle. Relay PR17 will remain energized and a spare lamp 130 will be lighted accordingly through a closed contacts PR17b. Contacts PR17a provide a self-holding circuit for PR17. The spare light will remain on until contacts PR14b open. This occurs when the coil PR14u is energized to unlatch relay PR14 upon receipt of a first ball of the next succeeding frame.

Strike cycle

Upon receipt of a first ball and the initiation of the cycling of the machine by the closing of pit switch 20 which activates the master control circuit and also the totalizing circuit of the present invention, the machine is programmed the same as for a normal first ball cycle. That is, the sweep moves down to its guard position adjacent alley B, a normal 2–3 seconds time delay occurs, the table T descends towards alley B where the grippers N of spotting unit K feel for standing pins and stepper relay SR1 advances to position 3. As no pins remain standing because a strike has been rolled, all of the contacts 28a of series connected switches 28 remain closed. A suitable strike detecting mechanism 132 is therefore actuated, causing strike detector relay PR4 to be energized. It will be understood that any of the known strike detecting mechanisms may be used as all known circuits of this type have a relay which is actuated in response to the detection of the absence of standing pins. For purposes of illustrating the present invention, such a relay is designated as PR4. Relay PR4 provides information to the master control circuit of the machine that a strike has occurred and alters the programming thereof accordingly. Certain contacts of relay PR4 are used to actuate stepper relay SR1 in proper sequence according to the strike cycle. Relay PR4 has a parallel connected slave relay PR11 with contacts for programming the counting and totalizing portion of the circuit of the present invention properly in accordance with the strike conditions.

When the strike detector 132 ascertains that no pins remain standing, which occurs at approximately the 160° position in the table rotation cycle, relay PR4 is energized and remains in an energized condition until the first ball of the next succeeding frame is rolled. The table continues to move through its operating cycle and the timer motor TM1, at the end of its normal timing period, causes contacts TM1b to close and advance stepper relay SR1 from position 3 to position 4. As strike relay PR4 is now energized, contacts PR4a are closed so that stepper relay SR1 is stepped from position 4 to position 5 through a circuit including line 66, contacts PR4a, interrupter contact 56, solenoid coil 54 to line 62. In the meantime, the sweep continues to operate in a normal manner and the table continues to run until it reaches approximately 260°, whereupon contacts TA1b close and advance the stepper relay SR1 from position 5 to position 6. However, contacts PR4b, c and d are closed so that the stepper relay SR1 is advanced in succession through steps 6, 7, 8, 9 to step 10.

Stepper relay SR1 remains on position 10 while the machine performs the usual operations associated with the strike cycle. That is, the sweep "runs through" and sweeps all fallen pins from the alley bed B, then returns to its guard position and table T descends on its second revolution and spots a new set of pins. When it has reached approximately 260° of its second revolution, table cam switch TA1 again closes its contacts TA1b which cause stepper relay SR1 to advance from position 10 to position zero where it remains until a first ball of the next suceceding frame is rolled.

During the strike cycle, modifications must be made to the pinfall totalizing circuits controlled by level II of stepper relay SR1. Contacts PR11b energize coil PR14L of latching relay PR14 so as to prevent relay PR14 from being unlatched when the actuating arm of level II of stepper relay SR1 passes position 6. This prevents a count cycle from occurring as the table makes its second revolution in spotting a new set of pins on alley B since contacts PR14a are held in an open position and relay PR6 cannot be energized. Normally closed contacts PR11a are also open during the strike cycle so that relay TR1 remains in an unenergized condition on position 9 of level II of stepper relay SR1. Accordingly, the table cannot reverse while the spotting of new pins is occurring during its second revolution in the strike cycle. Lamp 134 which indicates the presence of a strike is lighted by the closing of contacts PR11c on steps 8, 9 and 10. The lamp remains lit until stepper relay SR1 returns to its zero position, and relay PR4 and PR11 are deenergized.

The strike indicating lamp 134, spare indicating lamp 130, first and second ball foul indicating lamps 122 and 124, respectively, first and second ball lamps 104 and 106, respectively, and first and second ball pinfall totalizing lamps 100 and 112, respectively, are preferably mounted on a remote viewing mask which may be positioned in any convenient location, observable by a scorer. For example, when the system issued with pinspotting machines employed in tournament games, the mask may be located eight to sixteen feet above the alloy bed directly behind the machine so that it is visible to the official scorer but not to the bowler or spectators.

While the present invention has been disclosed by means of specific illustrative embodiments thereof, it would be obvious to those skilled in the art that various changes and modifications in the means of operation described or in the apparatus, may be made without departing from the spirit of the invention as defined in the appended claims.

I claim:

[1. In combination with a bowling pin spotting machine, signalling mechanism for indicating the actual, numerical pinfall totals each time a ball is rolled, and totalizing means associated with said machine for totalizing the numerical pinfall and operative in response to the number of fallen pins after each ball of a discrete playing frame is rolled for selectively energizing said signalling mechanism to indicate said total pinfall of said frame only.]

[2. In combination with a bowling pin spotting machine, a signalling mechanism for indicating the total number of pins which remain standing after each ball of a discrete playing frame is rolled, and totalizing means associated with said machine for totalizing the numerical pinfall and operative in response to the number of pins standing after each ball of said frame is rolled for selectively energizing said signalling mechanism to indicate the total, numerical pinfall of each playing frame only.]

[3. In combination with a bowling pin spotting machine, a table mounted for movement to and from a bowling alley for placing pins on said alley, a plurality of detecting elements carried by said table and operative upon movement of said table toward said alley to detect the presence or absence of pins after the rolling of each ball of a discrete playing frame, and totalizing means operative in response to actuation of said detecting elements for indicating for said frame only, the actual, numerical pinfall.]

[4. In combination with a bowling pin spotting machine having normal first and second ball operating cycles signalling mechanism for indicating the actual, numerical pinfall after each ball of a discrete playing frame is rolled, sensing means associated with said machine for detecting the presence or absence of standing pins after each ball of said frame is rolled, means associated with said sensing means for interrogating said sensing means to determine the number of fallen pins, means actuated by said interrogating means for temporarily storing information as to the total number of fallen pins for said frame only, and means operative at a predetermined time during the operating cycles of said machine for causing said temporary storage means to actuate said signalling mechanism and visually indicate said stored information for each discrete frame.]

[5. In combination with a bowling pin spotting machine, sensing means associated with said machine for detecting the presence or absence of standing pins after each ball of a discrete playing frame is rolled, means actuated by said machine during a predetermined portion of the operating cycle of the machine for interrogating said sensing means to determine the number of fallen pins and totalizing means operatively connected to said interrogating means and operative in response to the actuation of said interrogating means for totalizing for said frame only, the actual, numerical pinfall after the rolling of each ball.]

[6. In combination with a bowling pin spotting machine sensing means associated with said machine for detecting the presence or absence of standing pins after each ball of a discrete playing frame is rolled, means actuated during a predetermined portion of the operating cycle of the machine for interrogating said sensing means to determine the number of fallen pins, totalizing means operatively connected to said interrogating means and operative in response to the actuation of said interrogating means for totalizing for said frame only, the actual, numerical pinfall after the rolling of each ball, and signalling means associated with said totalizer means for indicating said total pinfall for said frame only, to a bowler.]

[7. In a combination with a bowling pin spotting machine, indicating mechanism including signalling means for indicating the actual, numerical pinfall, strikes and spares for each discrete playing frame only, and means associated with said machine and operative in response to the number of fallen pins after each ball of said frame is rolled for selecting one of said signalling means for indicating to a bowler the effect of each ball rolled in said frame.]

[8. In combination with a bowling pin spotting machine, sensing means associated with said machine for detecting the presence or absence of standing pins after each ball of ap laying frame is rolled, means actuated during a predetermined portion of the operating cycle of the machine for interrogating said sensing means to determine the number of fallen pins, totalizing means operatively connected to said interrogating means and operative in response to the actuation of said interrogating means for totalizing the actual, numerical pinfall for a discrete frame only, after the rolling of each ball of said frame, and means operatively connected to said interrogating means and operative in response to the absence of standing pins determined by said interrogating means after a second ball of said frame is rolled for indicating to a bowler that a spare has been made.]

[9. In combination with a bowling pin spotting machine, signalling mechanism for indicating the actual, numerical pinfall for a discrete playing frame only, after ıch ball of said frame is rolled, sensing means associated ith said machine for detecting the presence or absence : standing pins after each ball of said frame is rolled, ectrical means operatively connected to said sensing eans for interrogating said sensing means to determine e total number of fallen pins, electrical means con- ected to said interrogating means for temporarily storing formation as to the total number of fallen pins for id frame only, and read out means connected between id temporary storage means and said signalling mecha- sm and operative at a predetermined time during the erating cycle of said machine for causing said tem- rary storage means to actuate said signalling mecha- sm to indicate said stored information.]

[10. In combination with a bowling pin spotting ma- ine, a signalling mechanism for indicating the actual, merical pinfall for a discrete playing frame only, each me a ball of said frame is rolled, means associated with id machine and operative in response to the number : fallen pins after each ball of said frame is rolled for lectively energizing said signalling mechanism to indi- ite said total pinfall of said frame only, and means for capacitating said signalling mechanism whenever an legal ball is rolled.]

[11. In combination with a bowling pin spotting ma- ine having a table for movement to and from a bowling lley for placing pins on said alley, means carried by said ble and arranged to engage standing pins after the roll- g of a ball of a discrete playing frame, electrical sensing eans associated with said pin engaging means for detect- g the presence or absence of standing pins, means for terrogating said sensing means to determine the number f fallen pins, means responsive to a preselected position the cycle of revolution of said table for actuating said terrogating means, and totalizing means operatively onnected to said interrogating means and operative in sponse to the actuation of said interrogating means for talizing for said frame only, the actual, numerical pin- ll after the rolling of each ball of said frame.]

[12. In a bowling pin spotting machine, a table ounted for movement to and from a bowling alley, a lurality of pin spotters mounted on said table and adapted engage standing pins after the rolling of a ball of a dis- rete playing frame, detecting means associated with each otter for detecting the presence or absence of standing ins, means operatively connected to said detecting eans for individually searching each of said detecting eans to determine the number of fallen pins, and total- ing means operatively connected to said searching means r totalizing the actual, numerical pinfall for said dis- rete frame only.]

[13. In a bowling pin spotting machine, a table mount- d for movement to and from a bowling alley and having first and second operating cycle, a plurality of pin otters mounted on said table in an arrangement con- rming substantially with the playing positions of pins otted on said alley, a plurality of similarly arranged in respotting units mounted on said table, driving means r moving said table to and from said alley to engage tanding pins during the first cycle of operation of said ble and respot said standing pins on said alley during second cycle of operation of said table if pins re- ain standing after the first ball of a discrete playing rame is rolled, detecting means associated with said re- potting units for detecting the presence or absence of tanding pins after said first ball is rolled, means for in- rogating said detecting means during said first cycle f table operation to determine the number of fallen ins, means operative during said second table operating ycle for incapacitating said interrogating means while aid pins are being respotted, and totalizing means opera- ively connected to said interrogating means and operative response to the actuation of said interrogating means or totalizing for said frame only, the actual, numerical infall after the rolling of said first ball.]

14. In combination with a bowling pin spotting machine, having first and second ball operating cycles for each discrete playing frame of a bowling game, a first signalling mechanism for indicating the actual, numerical pinfall for a discrete frame only, after the first ball of a frame is rolled, a second signalling mechanism for indicating the actual, numerical pinfall for said discrete frame only, after the second ball of said frame is rolled, sensing means associated with said machine for detecting the presence or absence of standing pins after each ball of said frame is rolled, means associated with said sensing means for interrogating said sensing means to determine the number of fallen pins after each ball of said frame is rolled, first storage means actuated by said interrogating means during a first ball cycle for temporarily storing information as to the total number of fallen pins after a first ball of a frame is rolled, second storage means actuated by said interrogating means during a second ball cycle for temporarily storing information as to the total number of fallen pins after a second ball of a frame is rolled, and means operative at a predetermined time during the first and second ball operating cycles of said machine for causing said first temporary storage means to actuate said first signalling mechanism during said first ball cycle and said second temporary storage means to actuate said second signalling mechanism during said second ball cycle to visually indicate for said discrete frame only, the number of fallen pins during each cycle of said frame.

[15. In combination with a bowling pin spotting machine, sensing means associated with said machine for detecting the presence or absence of standing pins after each ball of a discrete playing frame is rolled, means actuated during a predetermined portion of the operating cycle of the machine for interrogating said sensing means to determine the number of fallen pins, totalizing means operatively connected to said interrogating means and operative in response to the actuation of said interrogating means for totalizing for said discrete frame only, the actual, numerical pinfall after the rolling of each ball, signalling means associated with said totalizing means for indicating said total pinfall for said discrete frame only, to a bowler, and means operative in response to the completion of said interrogation for actuating said signalling means.]

16. In a bowling pin spotting machine having a programming mechanism for programming the operation of said machine through a normal two ball playing cycle of a discrete playing frame, a table mounted for movement to and from a bowling alley for placing pins on said alley, a plurality of detecting elements carried by said table and operative upon movement of said table toward said alley to detect the presence or absence of pins after the rolling of each ball, totalizing means operative in response to actuation of said detecting elements for indicating for said discrete frame only, the actual, numerical pinfall after each ball of said playing cycle is rolled, driving means for moving said table to and from said alley during said playing cycle, means for actuating said table driving means after the second ball of said playing cycle is rolled to cause said table to descend and actuate said detecting elements, means operative after said table has descended to a preselected position for reversing said table driving means to cause said table to return to its normal starting position, and means for incapacitating said machine programming device after said second ball is rolled until said table has descended and returned to its normal starting position.

17. In combination with a bowling pin spotting machine having first and second ball operating cycles for each discrete playing frame of a bowling game, sensing means associated with said machine for detecting the presence or absence of standing pins after each ball of said frame is rolled, first and second totalizing means each operative respectively after said first and second ball has been rolled in response to actuation of said detector elements for indicating for said discrete frame only, the actual, numerical pinfall during said first or second ball cycles respectively, means operative after said second ball has been rolled for conditioning said second totalizing means for actuation by said detecting elements, said last-named means including means for incapacitating said first totalizing means after said second ball is rolled.

18. In combination with a bowling pin spotting machine having normal first and second ball operating cycles for each discrete playing frame of a bowling game and a table for movement to and from a bowling alley for placing pins on said alley, means carried by said table and arranged to engage standing pins after the rolling of a ball of said frame, electrical sensing means associated with said pin engaging means for detecting the presence or absence of standing pins, means for interrogating said sensing means to determine the number of fallen pins, means responsive to a preselected position in the course of travel of said table during each ball cycle of said frame for actuating said interrogating means, and first and second totalizing means operative in response to the actuation of said interrogating means for totalizing for said discrete frame only, the actual, numerical pin fall after the rolling of a first and second ball, respectively, and means for switchably connecting said interrogating means to said first totalizing means after a first ball of said frame is rolled and to said second totalizing means after a second ball of said frame is rolled.

[19. The invention defined in claim 4, including means operative during a selected portion of said second ball cycle of said frame for clearing and resetting said temporary storage means to zero to condition said means for storing information as to the total number of fallen pins in the next succeeding playing frame.]

[20. The invention defined in claim 5, including means actuated by said machine before a first ball of a new frame is rolled for clearing and resetting said totalizing means to zero to condition said totalizing means for reception of pinfall information occurring during the playing of a new frame.]

21. The invention defined in claim 17 including means actuated by said machine after said second ball operating cycle is completed for clearing and resetting said first and second totalizing means to zero to condition said totalizing means for indicating the pinfall occurring during a next succeeding playing frame.

22. The invention defined in claim 16 including means operative in response to the occurrence of a second ball foul for incapacitating said table reversing means and said totalizing means and including means for actuating said programming mechanism to program the operation of said machine through a normal second ball foul cycle.

23. The invention defined in claim 17 including means operative in response to the occurrence of a first ball foul for incapacitating said first totalizing means to prevent the totalizing for first ball pinfall and further including means operative in response to the occurrence of a second ball foul for incapacitating said second totalizing means to prevent the totalizing of second ball pinfall.

24. The invention defined in claim 18 including means operative in response to the occurrence of a first ball foul for incapacitating said first totalizing means to prevent the totalizing of first ball pinfall and further including means operative in response to the occurrence of a second ball foul for incapacitating said second totalizing means to prevent the totalizing of second ball pinfall.

25. In combination with a bowling pin spotting machine having normal first and second ball operating cycles for each discrete playing frame of a bowling game and a table for movement to and from a bowling alley for placing pins on said alley, means carried by said table and arranged to engage standing pins after the rolling of a ball of said frame, a plurality of detecting devices carried by said table and operative upon movement of said table toward said alley to detect the presence or absence of pins after the rolling of each ball, each of said detecting devices being adapted to indicate the presence of a selected standing pin, first and second totalizing circuits adapted to be sequentially connected to each of said detecting devices respectively after a first or second ball is rolled to totalize for said discrete frame only, the actual, numerical pinfall after the rolling of each ball, a first and second group of indicating devices operative during said first and second ball cycles respectively and adapted to visually indicate the results of said pinfall totalizing for said frame only, each of said totalizing circuits including a stepper relay having a plurality of contacts and an associated wiper finger and operative to selectively energize one of said groups of indicating devices, each of said indicating devices of each group being connected to a contact of its associated stepper relay and having indicia representative of selected pinfall, means operative in response to a preselected position in the operating cycle of said machine for sequentially connecting said stepper relay of said first totalizing circuit in operative association with each of said detecting devices during a first ball cycle and sequentially connecting said stepper relay associated with said second totalizing circuit in operative association with each of said detecting devices during said second ball cycle and means for advancing each stepper relay one position during its respective ball cycle each time said detecting device indicates the presence of a standing pin, and means for energizing the indicating device associated with the last contact to which said stepper relay actuating arm advances during its respective playing cycle to activate the indicia associated therewith.

26. The invention defined in claim 25 wherein said means for sequentially connecting each of said stepper relays to each of said detecting devices comprises an intermittently actuated search stepper relay having a plurality of contacts each connected to one of said detecting devices and an actuating arm switchably connected to said first and second stepper relays, said search stepper relay being operative to energize said totalizing relay and step said totalizing relay one position each time a detecting device is actuated.

[27. The invention defined in claim 8 including means operative in response to the rolling of the first ball of a new frame for incapaciting said spare indicating means.]

[28. In combination with a bowling pin spotting machine, signalling mechanism for indicating for a discrete playing frame only, the actual, numerical pinfall each time a ball of said frame is rolled, means associated with said machine and operative in response to the number of fallen pins after each ball of said frame is rolled for selectively energizing said signaling mechanism for indicating said total pinfall of said frame only, signalling mechanism for indicating the occurrence of a strike, in said discrete frame only, and means operative in response to the occurrence of a strike for incapacitating said first-named means to prevent said first-named signalling mechanism from indicating pinfall and including means for actuating said second-named signalling mechanism to indicate the occurrence of a strike.]

29. The invention defined in claim 16 wherein said programming mechanism has means for programming the operation of said bowling pin spotting machine through a normal strike cycle to condition said machine for the reception of a first ball on the next succeeding frame after a strike occurs, and further including means operative in response to the occurrence of a strike for incapacitating said totalizing means when said table spots a new set of pins in response to the occurrence of a strike, and means for incapacitating said table reversing means while said machine is programmed through said strike cycle.

[30. In a bowling pin spotting machine, a table mounted for movement to and from a bowling alley, a plurality of pin spotters mounted on said table and adapted to enage standing pins after the rolling of a ball of a discrete playing frame, detecting means associated with each potter for detecting the presence or absence of standing ins, means actuated by said machine during a predetermined portion of the operating cycle thereof for interrogating said detecting means to determine the number of standing pins, and pinfall totalizing means for totalizing or said discrete frame only, the actual, numeral pinfall fter the rolling of each ball including an electrical circuit connected to said interrogating means, said interrogating means including means for sequentially interrogating each of said detecting means for the presence of standing pins and further including means for intermittently actuating said electrical circuit each time a standing pin is detected, said circuit including a stepper relay having a plurality of discrete contact positions and an actuating arm and operative each time said circuit is actuated to advance said arm one contact position, and an indicating device connected to each contact position having selected indicia representative of the actual number of pins knocked down for said discrete frame only, each indicating device being selectively energized when said actuating arm advances from one contact position to another.]

References Cited

The following references, cited by the Examiner, are of record in the patented file of this patent or the original patent.

UNITED STATES PATENTS

| | | |
|---|---|---|
| 2,181,984 | 12/1939 | Warner. |
| 2,223,255 | 11/1940 | Koci. |
| 2,590,444 | 3/1952 | Millman et al. |
| 2,621,961 | 12/1952 | Whipple et al. |
| 2,646,984 | 7/1953 | Patterson. |
| 2,652,252 | 9/1953 | Alexander. |

FOREIGN PATENTS

| | | |
|---|---|---|
| 497,459 | 5/1930 | Germany. |

ANTON O. OECHSLE, Primary Examiner

U.S. Cl. X.R.

340—323